US010231156B2

United States Patent
Wu et al.

(10) Patent No.: US 10,231,156 B2
(45) Date of Patent: Mar. 12, 2019

(54) DATA TRANSMISSION METHOD AND DEVICE, AND DATA TRANSMISSION CONTROL METHOD AND DEVICE

(71) Applicant: CHINA ACADEMY OF TELECOMMUNICATIONS TECHNOLOGY, Beijing (CN)

(72) Inventors: Yumin Wu, Beijing (CN); Dajun Zhang, Beijing (CN)

(73) Assignee: China Academy Of Telecommunications Technology, Beijing (CN)

( * ) Notice: Subject to any disclaimer, the term of this patent is extended or adjusted under 35 U.S.C. 154(b) by 0 days.

(21) Appl. No.: 15/126,270

(22) PCT Filed: Mar. 19, 2015

(86) PCT No.: PCT/CN2015/074594
§ 371 (c)(1),
(2) Date: Sep. 14, 2016

(87) PCT Pub. No.: WO2015/139650
PCT Pub. Date: Sep. 24, 2015

(65) Prior Publication Data
US 2017/0086110 A1    Mar. 23, 2017

(30) Foreign Application Priority Data
Mar. 21, 2014  (CN) .......................... 2014 1 0108473

(51) Int. Cl.
*H04W 24/04* (2009.01)
*H04W 36/00* (2009.01)
(Continued)

(52) U.S. Cl.
CPC ....... *H04W 36/0088* (2013.01); *H04W 24/04* (2013.01); *H04W 24/10* (2013.01);
(Continued)

(58) Field of Classification Search
CPC . H04W 36/0088; H04W 24/04; H04W 24/10; H04W 76/025
See application file for complete search history.

(56) References Cited

U.S. PATENT DOCUMENTS

2010/0034126 A1* 2/2010 Kitazoe ............... H04W 74/085
                                                370/310
2012/0088516 A1    4/2012 Ji et al.
(Continued)

FOREIGN PATENT DOCUMENTS

CN        101873646 A       10/2010
CN        102572917 A        7/2012
(Continued)

OTHER PUBLICATIONS

English translation of Written Opinion of the International Search Authority for PCT/CN2015/074594 dated Jun. 29, 2015 obtained from Patentscope.
(Continued)

*Primary Examiner* — Qun Shen
(74) *Attorney, Agent, or Firm* — Ladas & Parry, LLP

(57) ABSTRACT

A data transmission method, a data transmission device, a data transmission control method and a data transmission control device are provided to adjust measurement gap configurations for multiple base stations communicating with an identical user equipment (UE), thereby preventing packet loss during measurement performed by the UE. The data transmission control method includes: determining, by a source base station communicating with the UE, a measurement gap configuration used by the source base station; and transmitting, by the source base station, the measurement gap configuration to the UE and a target base station communicating with the UE, to instruct the target base station and the UE to perform data transmissions in accordance the measurement gap configuration.

5 Claims, 6 Drawing Sheets

(51) Int. Cl.
*H04W 76/15* (2018.01)
*H04W 24/10* (2009.01)
*H04W 72/04* (2009.01)
*H04W 16/32* (2009.01)

(52) U.S. Cl.
CPC ... *H04W 36/0069* (2018.08); *H04W 72/0446* (2013.01); *H04W 76/15* (2018.02); *H04W 16/32* (2013.01)

(56) References Cited

U.S. PATENT DOCUMENTS

| | | | | |
|---|---|---|---|---|
| 2012/0178465 | A1* | 7/2012 | Lin | H04W 24/10 455/450 |
| 2012/0315908 | A1 | 12/2012 | Li | |
| 2013/0028126 | A1* | 1/2013 | Kazmi | H04W 36/0088 370/252 |
| 2013/0107742 | A1 | 5/2013 | Ishii | |
| 2014/0071944 | A1* | 3/2014 | Narasimha | H04W 36/0055 370/331 |
| 2014/0080484 | A1* | 3/2014 | Centonza | H04W 36/24 455/436 |
| 2014/0228027 | A1* | 8/2014 | Kuo | H04W 36/0088 455/436 |
| 2017/0054817 | A1* | 2/2017 | Wang | H04L 43/08 |

FOREIGN PATENT DOCUMENTS

| | | |
|---|---|---|
| CN | 102907134 A | 1/2013 |
| CN | 103888987 A | 6/2014 |
| EP | 2765798 A1 | 8/2014 |
| JP | 2011/166387 A | 8/2011 |
| JP | 2011/223102 A | 11/2011 |
| JP | 2012/004608 A | 1/2012 |

OTHER PUBLICATIONS

International Preliminary Report on Patentability (IPRP) for PCT/CN2015/074594 dated Sep. 21, 2016 with English translation obtained from Patentscope.
New Postcom, "R2-114123: Discussions on Inter-freq ICIC Scenarios", 3GPP TSG RAN WG2 Meeting #75, Aug. 26, 2011, ISSN: 3GPP.
ZTE, "R2-114947: Measurement Restriction for Inter-frequency eICIC", 3GPP TSG RAN WG2 Meeting #75bis, Oct. 14, 2011, ISSN: 3GPP.
International Search Report for PCT/CN2015/074594 dated Jun. 29, 2015 and its English translation provided by WIPO.
Written Opinion of the International Search Authority PCT/CN2015/074594 dated Jun. 29, 2015 and machine English translation from Google Translate.
First Office Action for Chinese application No. 201410108473.3 dated Sep. 27, 2016 and search report, with machine English translation from Global Dossier.
Second Office Action for Chinese application No. 201410108473.3 dated Mar. 1, 2017 with machine English translation from Global Dossier.
Third Office Action for Chinese application No. 201410108473.3 dated Jul. 18, 2017 with machine English translation from Global Dossier.
Supplementary European Search Report and Opinion for European Patent application No. EP 15765760 dated Jan. 26, 2017.
Office Action for Korean Patent application No. 10-2016-7025219 dated May 24, 2017 with English translation provided by foreign associate.
"UE Capability for Dual Connectivity" 3GPP TSG RAN WG1 #76 R1-140377 Prague, Czech Republic, Feb. 10-14, 2014 (pp. 1-2).
"Discussion on UE configuration in small cell enhancement" 3GPP TSG-RAN2 meeting #83bis R2-133292 Ljubljana, Slovenia, Oct. 7-11, 2013.
"Discussion on measurement gap in dual connectivity" 3GPP TSG-RAN WG2 Meeting #85 R2-140237 Feb. 10 to 14, 2014, Prague, Czech (pp. 1-3).
R2-140049—"Stage 2 Changes for Dual Connectivity"; 3GPP TSG-RAN WG2 Meeting #85; Prague, Czech Republic; Feb. 10-14, 2014; pp. 1-45.
R2-134065—"Discussion on UE configuration in small cell enhancement"; 3GPP TSG-RAN2 meeting #84; San Francisco, US, Nov. 4-8, 2013; pp. 1-2.
R2-140619—"RRC messages over X2 for DC"; 3GPP TSG RAN2 Meeting #85; Prague, Czech Republic Feb. 10-14, 2014; pp. 1-6.
R2-141599—"Measurement gap configuration for Dual Connectivity"; 3GPP TSG-RAN WG2 Meeting #85bis; Valencia, Spain, Mar. 31-Apr. 4, 2014; pp. 1-6.
R2-141558—"Measurement Gap Issues for Dual Connectivity"; 3GPP TSG RAN WG2 Meeting #85bis; Valencia, Spain, Mar. 31-Apr. 4, 2014; pp. 1-5.
From Japanese Application No. 2016/557985, Office Action dated Nov. 7, 2017 and its English translation provided by Global Dossier.

* cited by examiner

DATA TRANSMISSION METHOD AND DEVICE, AND DATA TRANSMISSION CONTROL METHOD AND DEVICE

CROSS-REFERENCE TO RELATED APPLICATIONS

The present application is the U.S. national phase of PCT Application PCT/CN2015/074594 filed on Mar. 19, 2015, which claims the priority of the Chinese patent application No. 201410108473.3 filed on Mar. 21, 2014 and entitled "data transmission method and device, and data transmission control method and device", which are incorporated herein by reference in their entireties.

TECHNICAL FIELD

The present disclosure relates to the field of communications technology, in particular to a data transmission method, a data transmission device, a data transmission control method and a data transmission control device.

BACKGROUND

Along with the deployment of more and more local nodes such as Femtocells, micro cells and relays, conventional network architecture mainly based on macro base stations is gradually evolving into network architecture in which various kinds of base stations exist, so as to provide multilayered network coverage. In order to improve performances of the network architecture including various kinds of base stations, a network architecture, in which coordination/aggregation among multiple evolved Node-Bs (eNBs) is achieved via non-ideal link, has been proposed. In this architecture, some Radio Bearers (RBs) for a User Equipment (UE) are in a Master Cell Group (MCG) managed by a Master eNB (MeNB), and these RBs include control-plane bearers, i.e., Signaling Radio Bearers (SRBs), and user-plane bearers, i.e., Data Radio Bearers (DRBs). A Primary Cell (PCell) is provided with a Physical Uplink Control Channel (PUCCH). In addition, some other RBs for the same UE are in a Secondary Cell Group (SCG) managed by a Secondary eNB (SeNB), and a special cell is provided with a PUCCH. The UE communicates with two eNBs in this architecture, and this situation is called as Dual Connectivity (DC). In the case that the UE needs to perform inter-frequency measurement, a measurement gap needs to be configured by a network for the UE. In the case that the measurement gap is configured for some cells while the other cells operate normally, data transmissions in the other cells may be interrupted when the UE performs the inter-frequency measurement.

Relevant technologies are described hereinafter.

1. DC Technology

In a possible multilayered network coverage environment as shown in FIG. 1, a non-ideal data/signaling interface, i.e., an Xn interface, is adopted between the MeNB and the SeNB, and the UE may communicate with the MeNB and the SeNB simultaneously. In the case that the UE communicating with the MeNB enters the coverage of a cell managed by the SeNB, the MeNB may transfer a part of or all of the data/signaling of the UE to the SeNB based on signal intensity or load balancing, so that the UE is served by the SeNB. At this time, the UE may use resources from the MeNB and the SeNB simultaneously, so as to achieve the inter-eNB aggregation. In this scenario, multiple RBs of the UE may be in the SCG and the MCG, and the RBs associated with the SeNB may include DRB and/or SRB.

2. DC Architecture

FIG. 2 shows a first kind of the DC architecture, where the UE has independent bearers for both the MeNB and the SeNB. Each eNB includes an independent Packet Data Convergence Protocol (DPCP) entity for the UE.

FIG. 3 shows a second kind of the DC architecture, where a connection between the UE and the MeNB has an independent bearer. For achieving a connection between the UE and the SeNB, a part of data carried on one Evolved Packet System (EPS) bearer of the MeNB is allocated to, and transmitted on, the SeNB. The DPCP entity of the EPS bearer is still in the MeNB, and an independent Radio Link Control (RLC) entity is in the SeNB.

3. Measurement Gap

During the inter-frequency measurement, the UE may not receive and transmit the data at a current serving frequency normally, so a measurement gap needs to be configured by a network side for the UE, so as to perform the inter-frequency measurement without any packet loss. The configuration of the measurement gap needs to meet the following requirements. The measurement gap may be configured in accordance with different gap patterns. For example, for gap pattern 0, the measurement gap is 6 ms, and a measurement gap repetition period is 40 ms.

TABLE 1

Measurement gap configuration supported by UE

| Gap Pattern ID | Measurement Gap Length (MGL, ms) | Measurement Gap Repetition Period (MGRP, ms) | Minimum available time for inter-frequency and inter-RAT measurements during 480 ms period (Tinter1, ms) | Measurement Purpose |
|---|---|---|---|---|
| 0 | 6 | 40 | 60 | Inter-Frequency E-UTRAN FDD and TDD, UTRAN FDD, GERAN, LCR TDD, HRPD, CDMA2000 1x |
| 1 | 6 | 80 | 30 | Inter-Frequency E-UTRAN FDD and TDD, UTRAN FDD, GERAN, LCR TDD, HRPD, CDMA2000 1x |

4. Adjustment of Receiver of UE

In the case that multiple serving frequencies are configured by the network for the UE, the network may issue an activation command, so as to activate the serving frequency for the UE. After the receipt of the activation command, the UE may adjust its receiver. In the case that an identical receiver is shared, an interruption period caused by the adjustment of the receiver is 5 ms, and in the case that the UE has multiple independent receivers, the interruption period caused by the adjustment is 1 ms. Because the network is aware of a time point where the UE adjusts its receiver, no data transmission is scheduled during the adjustment, so as to prevent the packet loss due to the adjustment. However, the network does not known a type of the receiver of the UE, so based on the interruption period of 5 ms, the data transmission may not be scheduled within a time period specified in a protocol.

5. Measurement Gap Configuration for DC

Measurement gap configuration set for UE: the measurement gap configuration issued by the network to the UE is applied to all the serving frequencies, and within the measurement gap, the UE should not perform the reception and transmission of the data at all the serving frequencies.

Measurement gap configuration set for eNB (or cell group): the measurement gap configuration issued by the network to the UE is applied to a part of the serving frequencies, e.g., SCG or MCG, and within the measurement gap, the UE only should not perform reception and transmission of the data at these serving frequencies configured with the measurement gap.

In a word, in the case of DC, there is no solution for interruption caused by the measurement gap. In the case that a measurement gap is configured by the MeNB for the MCG associated with the UE or another measurement gap is configured by the SeNB for the SCG associated with the UE, the UE may adjust the frequency for the receiver at the beginning and end of the measurement. At this time, in the case that the SeNB (or MeNB) cannot know the measurement gap configured for the MCG (or SCG), packet loss may occur at the SeNB during the adjustment of the receiver of the UE. In addition, in the case that a measurement gap is configured by the MeNB for the UE but the SeNB does not know this measurement gap configuration, the packet loss may also occur.

SUMMARY

The present disclosure provides a data transmission method, a data transmission device, a data transmission control method and a data transmission control device, to coordinate measurement gap configurations for multiple base stations communicating with an identical UE, thereby preventing packet loss during the measurement performed by the UE.

In one aspect, the present disclosure provides in some embodiments a data transmission control method, including steps of: determining, by a source base station communicating with a UE, a measurement gap configuration used by the source base station; and transmitting, by the source base station, the measurement gap configuration to the UE and a target base station communicating with the UE, to instruct the target base station and the UE to perform data transmissions in accordance with the measurement gap configuration.

According to the data transmission control method in the embodiments of the present disclosure, the source base station communicating with the UE notifies the measurement gap configuration used by the source base station to the target base station communicating with the UE, so that the target base station performs data transmission in accordance with the measurement gap configuration. As a result, it is able to prevent the packet loss during the measurement performed by the UE.

Optionally, the source base station is an MeNB and the target base station is an SeNB, or the source base station is an SeNB and the target base station is an MeNB.

In another aspect, the present disclosure provides in some embodiments a data transmission method, including steps of: receiving, by a target base station communicating with a UE, a measurement gap configuration used by a source base station communicating with the UE; and performing, by the target base station, data transmission in accordance with the measurement gap configuration.

According to the data transmission method in the embodiments of the present disclosure, the target base station communicating with the UE may perform data transmission in accordance with the measurement gap configuration used by the source base station communicating with the UE. As a result, it is able to prevent the packet loss during the measurement performed by the UE.

Optionally, the step of performing, by the target base station, data transmission in accordance with the measurement gap configuration includes: determining, by the target base station, a start point for not performing data transmission within a measurement gap configured by the measurement gap configuration, in accordance with a protocol; and with respect to each measurement gap, not performing, by the target base station, data transmission between the target base station and the UE within a predetermined time period from the start point.

Optionally, the start point includes a first start point and a second start point, and with respect to each measurement gap, the target base station does not perform the data transmission between the target base station and the UE within a predetermined time period from the first start point and within a predetermined time period from the second start point.

Optionally, the first start point and the second start point are a start point and an end point of the measurement gap respectively.

Optionally, the data transmission method further includes setting, by the target base station, a measurement gap configuration used by the target base station based on the measurement gap configuration used by the source base station, and transmitting the measurement gap configuration used by the target base station to the source base station and the UE.

Optionally, the measurement gap configuration used by the target base station is completely or partially identical to the measurement gap configuration used by the source base station.

In yet another aspect, the present disclosure provides in some embodiments a data transmission method, including steps of: receiving, by a UE, a measurement gap configuration used by a source base station communicating with the UE; and performing, by the UE, data transmission in a serving cell that is not configured with the measurement gap configuration, in accordance with the measurement gap configuration.

According to the data transmission method in the embodiments of the present disclosure, the UE transmits the data in the serving cell that is not configured with the measurement gap configuration, in accordance with the measurement gap configuration. As a result, it is able to prevent the packet loss during the measurement performed by the UE.

Optionally, the step of performing, by the UE, data transmission in the serving cell that is not configured with the measurement gap configuration, in accordance with the measurement gap configuration includes: determining, by the UE, a start point for not performing data transmission within a measurement gap configured by the measurement gap configuration, in accordance with a protocol; and with respect to each measurement gap, not performing, by the UE, data transmission in the serving cell that is not configured with the measurement gap configuration, within a predetermined time period from the start point.

Optionally, the start point includes a first start point and a second start point, and with respect to each measurement gap, the UE does not perform data transmission in the serving cell that is not configured with the measurement gap configuration, within a predetermined time period from the first start point and within a predetermined time period from the second start point.

Optionally, the first start point and the second start point are a start point and an end point of the measurement gap respectively.

In still yet another aspect, the present disclosure provides in some embodiments a data transmission control device, including: a measurement gap configuration determination unit configured to determine a measurement gap configuration used by a source base station communicating with a UE; and a transmission unit configured to transmit the measurement gap configuration to the UE and a target base station communicating with the UE, to instruct the target base station and the UE to perform data transmissions in accordance the measurement gap configuration.

According to the data transmission control device in the embodiments of the present disclosure, the source base station communicating with the UE notifies the measurement gap configuration used by the source base station to the target base station communicating with the UE, so that the target base station performs data transmission in accordance with the measurement gap configuration. As a result, it is able to prevent the packet loss during the measurement performed by the UE.

In still yet another aspect, the present disclosure provides in some embodiments a data transmission device, including: a reception unit configured to receive a measurement gap configuration used by a source base station communicating with a UE; and a processing unit configured to perform data transmission in accordance with the measurement gap configuration.

According to the data transmission device in the embodiments of the present disclosure, the target base station communicating with the UE may perform data transmission in accordance with the measurement gap configuration used by the source base station communicating with the UE. As a result, it is able to prevent the packet loss during the measurement performed by the UE.

Optionally, the processing unit is configured to: determine a start point for not performing data transmission within a measurement gap configured by the measurement gap configuration, in accordance with a protocol; and with respect to each measurement gap, not perform the data transmission associated with the UE within a predetermined time period from the start point.

Optionally, the start point includes a first start point and a second start point, and with respect to each measurement gap, the processing unit does not perform the data transmission associated with UE within a predetermined time period from the first start point and within a predetermined time period from the second start point.

Optionally, the first start point and the second start point are a start point and an end point of the measurement gap respectively.

Optionally, the processing unit is further configured to set a measurement gap configuration used by the target base station based on the measurement gap configuration used by the source base station, and transmit the measurement gap configuration used by the target base station to the source base station and the UE.

Optionally, the measurement gap configuration used by the target base station is completely or partially identical to the measurement gap configuration used by the source base station.

Optionally, the data transmission device further includes the measurement gap configuration determination unit and the transmission unit in the above-mentioned data transmission control device.

In still yet another aspect, the present disclosure provides in some embodiments an eNB, including a processor, a transceiver configured to receive and transmit data under the control of the processor, and a memory configured to store therein data accessible by the processor according to needs during the operation.

Optionally, in the case that the eNB is an MeNB, the processor is configured to: determine a measurement gap configuration used by a source base station communicating with a UE; and transmit, via the transceiver, the measurement gap configuration to the UE and a target base station communicating with the UE, to instruct the target base station and the UE to perform data transmissions in accordance the measurement gap configuration.

According to the MeNB in the embodiments of the present disclosure, the source base station communicating with the UE notifies the measurement gap configuration used by the source base station to the target base station communicating with the UE, so that the target base station perform data transmission in accordance with the measurement gap configuration. As a result, it is able to prevent the packet loss during the measurement performed by the UE.

Optionally, in the case that the eNB is an SeNB, the processor is configured to: receive, via the transceiver, a measurement gap configuration used by a source base station communicating with a UE; and perform data transmission in accordance with the measurement gap configuration.

According to the SeNB in the embodiments of the present disclosure, the target base station communicating with the UE may perform data transmission in accordance with the measurement gap configuration used by the source base station communicating with the UE. As a result, it is able to prevent the packet loss during the measurement performed by the UE.

Optionally, in the case that the eNB is an SeNB and data transmission is performed in accordance with the measurement gap configuration, the processor is configured to: determine a start point for not performing data transmission within a measurement gap configured by the measurement gap configuration, in accordance with a protocol; and with respect to each measurement gap, not perform data transmission associated with the UE within a predetermined time period from the start point.

Optionally, in the case that the eNB is an SeNB, the start point includes a first start point and a second start point, and with respect to each measurement gap, the processor is configured to not perform data transmission associated with the UE within a predetermined time period from the first start point and within a predetermined time period from the second start point.

Optionally, in the case that the eNB is an SeNB, the first start point and the second start point are a start point and an end point of the measurement gap respectively.

Optionally, in the case that the eNB is an SeNB, the processor is further configured to: set a measurement gap configuration used by the target base station based on the measurement gap configuration used by the source base station, and transmit the measurement gap configuration used by the target base station to the source base station and the UE.

Optionally, in the case that the eNB is an SeNB, the measurement gap configuration used by the target base station is completely or partially identical to the measurement gap configuration used by the source base station.

In still yet another aspect, the present disclosure provides in some embodiments a data transmission device, including: a reception unit configured to receive a measurement gap configuration used by a source base station communicating with a UE; and a processing unit configured to transmit data in a serving cell that is not configured with the measurement gap configuration, in accordance with the measurement gap configuration.

According to the data transmission device in the embodiments of the present disclosure, the UE performs data transmission in the serving cell that is not configured with the measurement gap configuration, in accordance with the measurement gap configuration. As a result, it is able to prevent the packet loss during the measurement performed by the UE.

Optionally, the processing unit is configured to: determine a start point for not performing data transmission within a measurement gap configured by the measurement gap configuration, in accordance with a protocol; and with respect to each measurement gap, not perform the data transmission in the serving cell that is not configured with the measurement gap configuration, within a predetermined time period from the start point.

Optionally, the start point includes a first start point and a second start point, and with respect to each measurement gap, the processing unit is configured to not perform the data transmission in the serving cell that is not configured with the measurement gap configuration, within a predetermined time period from the first start point and within a predetermined time period from the second start point.

Optionally, the first start point and the second start point are a start point and an end point of the measurement gap respectively.

In still yet another aspect, the present disclosure provides in some embodiments a UE, including a processor, a transceiver configured to receive and transmit data under the control of the processor, and a memory configured to store therein data accessible by the processor according to needs during the operation. The processor is configured to: receive, via the transceiver, a measurement gap configuration used by a source base station communicating with the UE; and perform data transmission in a serving cell that is not configured with the measurement gap configuration, in accordance with the measurement gap configuration.

According to the embodiments of the present disclosure, the UE transmits the data in the serving cell that is not configured with the measurement gap configuration, in accordance with the measurement gap configuration. As a result, it is able to prevent the packet loss during the measurement performed by the UE.

Optionally, in the case that the UE performs data transmission in the serving cell that is not configured with the measurement gap configuration, in accordance with the measurement gap configuration, the processor is further configured to: determine a start point for not performing data transmission within a measurement gap of the measurement gap configuration, in accordance with a protocol; and with respect to each measurement gap, not perform the data transmission in the serving cell that is not configured with the measurement gap configuration, within a predetermined time period from the start point.

Optionally, the start point includes a first start point and a second start point, and with respect to each measurement gap, the processor is configured to not perform the data transmission in the serving cell that is not configured with the measurement gap configuration, within a predetermined time period from the first start point and within a predetermined time period from the second start point.

Optionally, the first start point and the second start point are a start point and an end point of the measurement gap respectively.

DETAILED DESCRIPTION OF THE EMBODIMENTS

The present disclosure provides in some embodiments a data transmission method, a data transmission device, a data transmission control method and a data transmission control device, so as to coordinate measurement gap configurations for multiple base stations communicating with an identical UE, thereby preventing the UE from losing packets when performing measurements in the measurement gaps.

In the embodiments of the present disclosure, after one eNB configures a measurement gap to be used by itself, the measurement gap configuration may be transmitted to another eNB. After the receipt of the measurement gap configuration, within a time period specified by a protocol, the another eNB may not schedule any data transmission with the UE at the beginning and end of the each measurement gap. In the case the another eNB receiving the measurement gap for the one eNB also needs to configure a measurement gap for itself, the measurement gap for the other eNB may be adjusted based on the received measurement gap, so that the two measurement gaps may completely or partially overlap each other.

The present disclosure will be described hereinafter in conjunction with embodiments.

A first Embodiment provides a measurement gap configuration set for UE.

The present disclosure provides in this embodiment a data transmission method, which includes the following steps.

In step 1, an MeNB transmits a measurement gap configuration to an SeNB. This measurement gap configuration is set for an entire UE, i.e., for all serving frequencies for the UE.

In step 2, after the receipt of the measurement gap configuration in step 1, the SeNB does not receive data from and transmit data to the UE within a measurement gap.

In step 3, the MeNB transmits the measurement gap configuration to the UE, and does not receive data from and transmit data to the UE within the measurement gap.

In step 4, after the receipt of the measurement gap configuration in step 3, the UE does not receive and transmit data within the measurement gap.

The SeNB may set a measurement gap configuration and may transmit the measurement gap configuration to the MeNB and the UE. The procedure is similar to that mentioned above, and thus will not be particularly defined herein.

A second Embodiment provides single measurement gap configuration for a cell or a cell group.

The present disclosure provides in this embodiment a data transmission method, which includes the following steps.

In step 1, an MeNB transmits a measurement gap configuration (subframes 2 to 7) to an SeNB. This measurement gap configuration is set for an MCG, i.e., for frequencies of the MCG for a UE.

Figure 1:
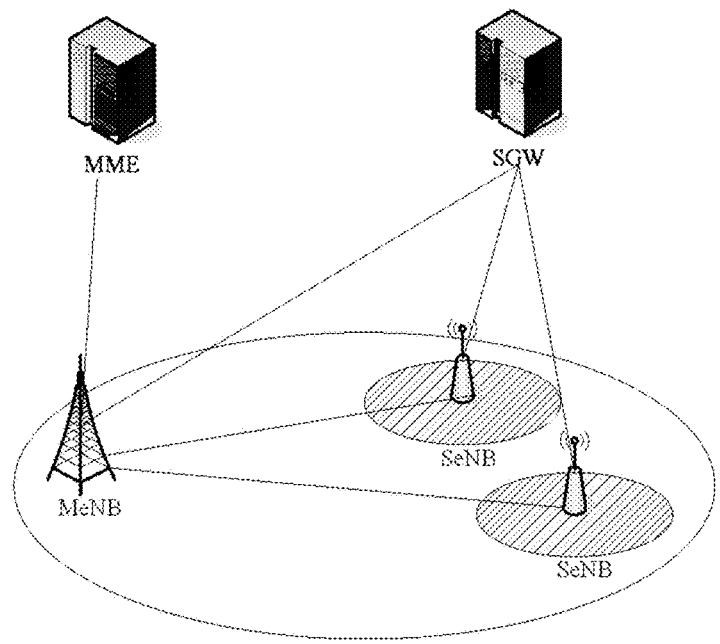
FIG. 1 is a schematic view showing a scenario for a conventional DC network.
Figure 2:
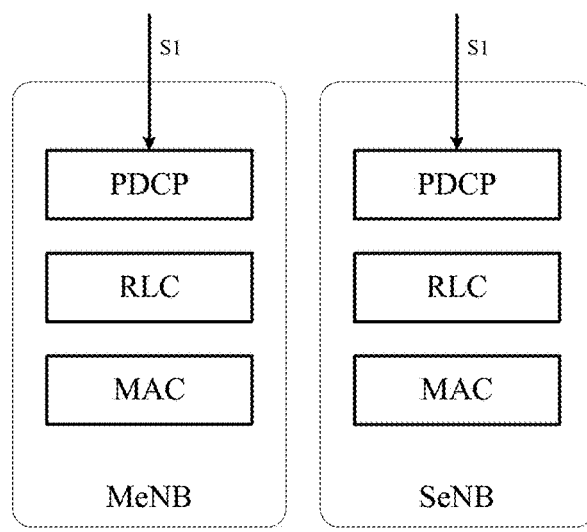
FIG. 2 is a schematic view showing a first kind of conventional DC architecture.
Figure 3:
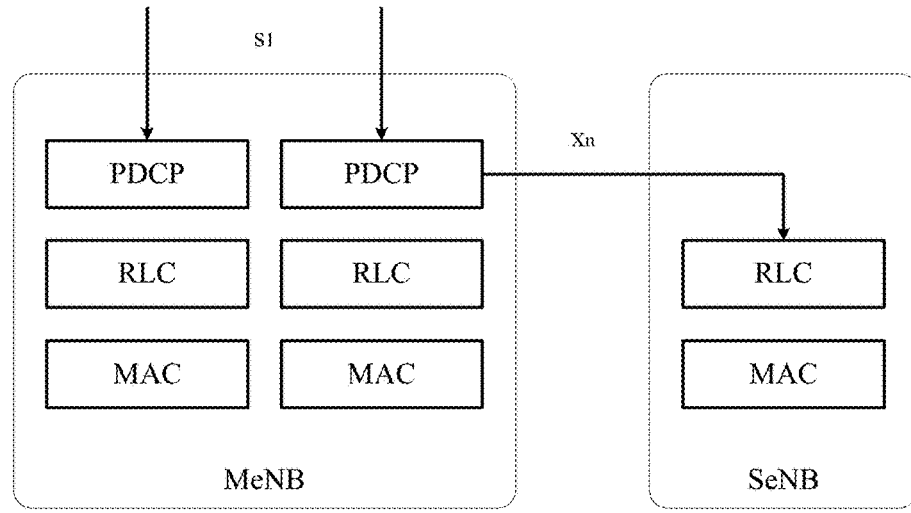
FIG. 3 is another schematic view showing a second kind of the conventional DC architecture.
Figure 4:
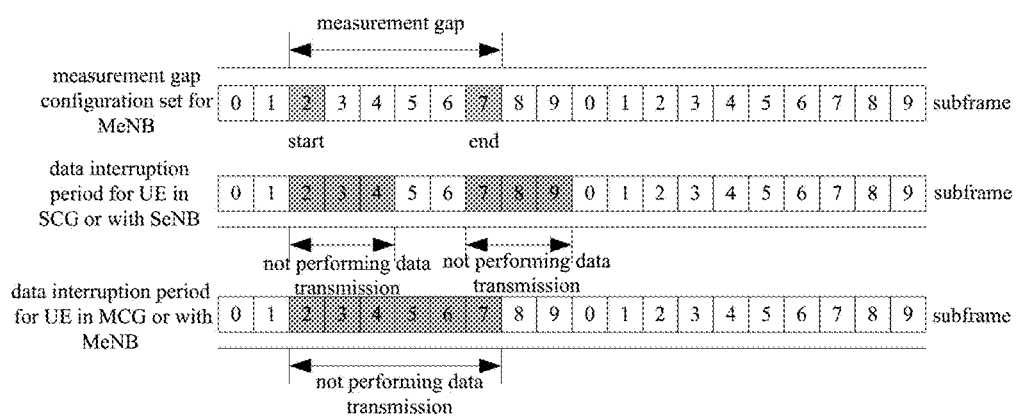
FIG. 4 is a schematic view showing measurement gap auxiliary information according to an embodiment of the present disclosure.

In step 2, after the SeNB has received the measurement gap configuration for the MCG in step 1, data transmissions are not performed as shown in FIG. 4.

For example, the SeNB may not receive data from or transmit data to the UE within a time period (e.g., within three consecutive subframes) specified in a protocol and starting from a start point of a measurement gap (e.g., a first subframe of the measurement gap, i.e., subframe 2), and may not receive data from or transmit data to the UE within a time period (e.g., within three consecutive subframes) specified in the protocol and starting from an end point of the measurement gap (e.g., a last subframe of the measurement gap, i.e., subframe 7).

For another example, the SeNB may not receive data from or transmit data to the UE within a time period (e.g., within three consecutive subframes) specified in a protocol and starting from a second subframe of the measurement gap (i.e., subframe 3), and may not receive data from or transmit data to the UE within a time period (e.g., within three consecutive subframes) specified in the protocol and starting from a fifth subframe of the measurement gap (i.e., subframe 6).

In step 3, after the transmission of the measurement gap configuration to the SeNB, the MeNB transmits the measurement gap configuration to the UE, and does not receive or transmit data at all serving frequencies of the MCG within the measurement gap set for the MCG.

In step 4, after the receipt of the measurement gap configuration for serving frequencies of the MCG, the UE does not receive or transmit data at all the serving frequencies of the MCG within the measurement gap set for the MCG, but continues to receive and transmit data at serving frequencies of an SCG.

For example, the UE may not receive or transmit data within a time period (e.g., three consecutive subframes) specified in a protocol and starting from a start point of the measurement gap (e.g., a first subframe of the measurement gap, i.e., subframe 2), and may not receive or transmit data within a time period (e.g., three consecutive subframes) specified in the protocol and starting from an end point of the measurement gap (e.g., a last subframe of the measurement gap, i.e., subframe 7).

For another example, the UE may not receive data from or transmit data within a time period (e.g., within three consecutive subframes) specified in a protocol and starting from a second subframe of the measurement gap (i.e., subframe 3), and may not receive data from or transmit data within a time period (e.g., within three consecutive subframes) specified in the protocol and starting from a fifth subframe of the measurement gap (i.e., subframe 6).

It should be appreciated that, the SeNB may also set a measurement gap configuration and may transmit the measurement gap configuration to the MeNB and the UE, and a rule for not performing data transmission in this case may be identical to a rule for not performing data transmissions by the MeNB and UE at frequencies of the MCG. The procedure is similar to that mentioned above, and thus will not be particularly defined herein.

Optionally, the measurement gap configuration may be set for a cell, and not performing the data transmission in the other cells may follow the identical rule. The procedure is similar to that mentioned above, and thus will not be particularly defined herein.

According to a third Embodiment, multiple measurement gap configurations set for cell groups are provided, where the multiple measurement gaps are coordinated to completely overlap each other.

Figure 5:
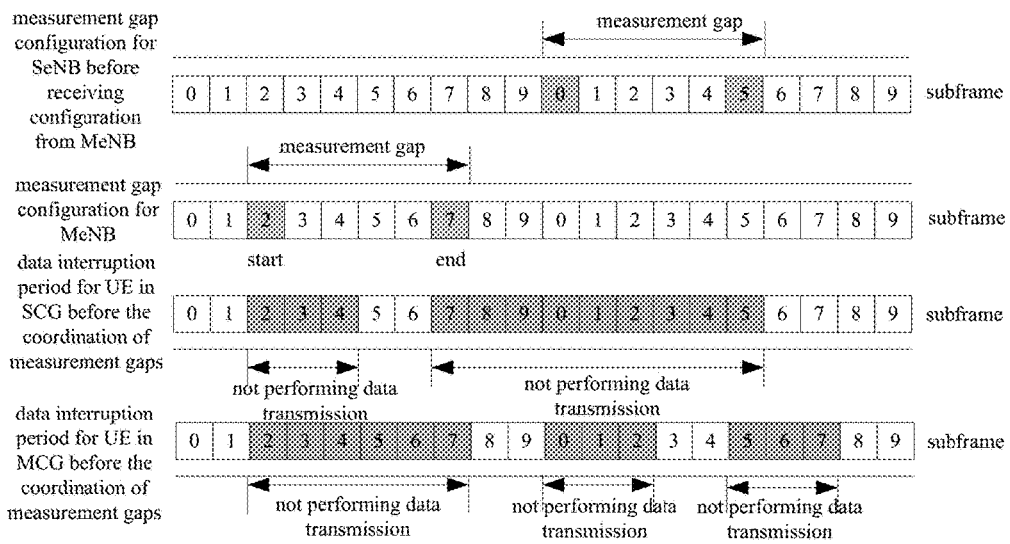
FIG. 5 is a schematic view showing the situation of not performing data transmission before the coordination of measurement gap configurations according to an embodiment of the present disclosure.

Each of an SeNB and an MeNB sets a measurement gap configuration independently. Hence, before the coordination of the two measurement gap configurations, a UE should not perform the data reception and transmission within more subframes in an MCG and an SCG, as shown in FIG. 5.

In this embodiment, the rules for not performing data transmissions by the MeNB, the SeNB and the UE may be understood with reference to those mentioned in the second embodiment.

The present disclosure provides in this embodiment a data transmission method, which includes the following steps.

In step 1, a measurement gap configuration issued by an MeNB to a UE is set for an MCG, the MeNB transmits the measurement gap configuration set for the MCG (subframes 2 to 7) to the SeNB.

Figure 6:
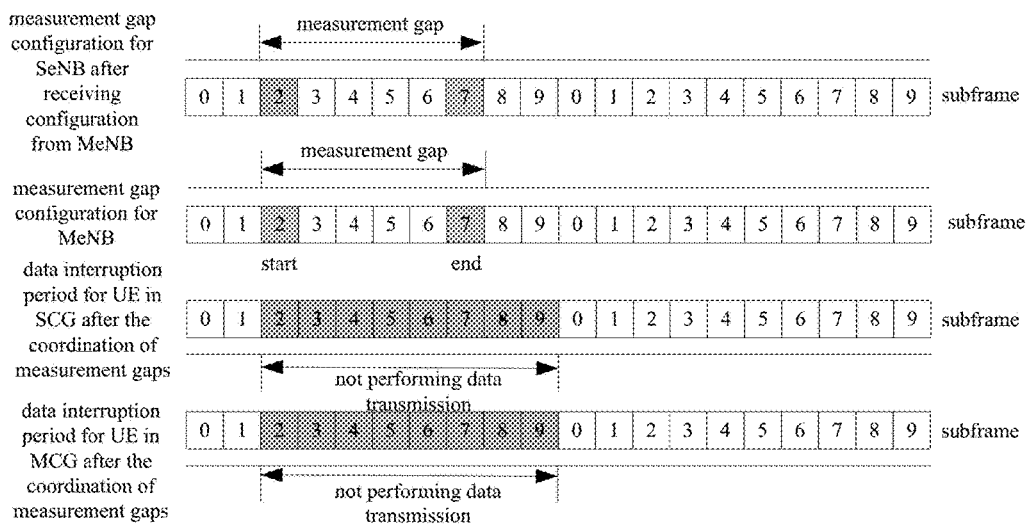
FIG. 6 is a schematic view showing the situation of not performing data transmission after the coordination of measurement gap configurations according to an embodiment of the present disclosure.

In step 2, after the receipt of the measurement gap configuration set for the MCG in step 1, as shown in FIG. 6, the SeNB adjusts a measurement gap configuration set for an SCG to make the measurement gap configuration set for the SCG completely coincide with the measurement gap configuration set for the MCG. At serving frequencies of the SCG, the SeNB does not receive data from or transmit data to the UE within a time period (e.g., three consecutive subframes) specified in a protocol and starting from a start point of a measurement gap set for the MCG (e.g., a first substrate of each measurement gap, i.e., subframe 2), and does not receive data from or transmit data to the UE within a time period (e.g., three consecutive subframes) specified in the protocol and starting from an end point of the measurement gap set for the MCG (e.g., a last subframe of each measurement gap, i.e., subframe 7). In addition, the SeNB does not receive data from or transmit data to the UE within a measurement gap set for the SCG. The SeNB transmits the measurement gap configuration set by itself to the MeNB and the UE.

In step 3, after the transmission of the measurement gap configuration set for the MCG to the SeNB, the MeNB transmits the measurement gap configuration set for the MCG to the UE.

In step 4, after the receipt of the measurement gap configuration set for the SCG in step 2, as shown in FIG. 6, at serving frequencies of the MCG, the MeNB does not receive data from or transmit data to the UE within a time period (e.g., three consecutive subframes) specified in a protocol and starting from a start point of the measurement gap set for the SCG (e.g., a first substrate of the measurement gap, i.e., subframe 2), and does not receive data from or transmit data to the UE within a time period (e.g., three consecutive subframes) specified in the protocol and starting from an end point of the measurement gap set for the SCG (e.g., a last subframe of the measurement gap, i.e., subframe 7). In addition, the MeNB does not receive data from or transmit data to the UE within the measurement gap set for the MCG.

In step 5, after the receipt of the measurement gap set for the serving frequencies of the MCG in step 3 and the measurement gap set for the serving frequencies of the SCG in step 4, at the serving frequencies of the SCG, the UE does not receive or transmit data within a time period (e.g., three consecutive subframes) specified in a protocol and starting from a start point of the measurement gap set for the MCG (e.g., a first substrate of the measurement gap, i.e., subframe 2), and does not receive or transmit data within a time period (e.g., three consecutive subframes) specified in the protocol and starting from an end point of the measurement gap set for the MCG (e.g., a last subframe of the measurement gap, i.e., subframe 7); in addition, the UE does not receive or transmit data within the measurement gap set for the SCG. At the serving frequencies of the MCG, the UE does not receive or transmit data within a time period (e.g., three consecutive subframes) specified in a protocol and starting from a start point of the measurement gap set for the SCG (e.g., a first substrate of the measurement gap, i.e., subframe 2), and does not receive or transmit data within a time period (e.g., three consecutive subframes) specified in the protocol and starting from an end point of the measurement gap set for the SCG (e.g., a last subframe of each measurement gap, i.e., subframe 7); in addition, the UE does not receive or transmit data within the measurement gap set for the MCG.

It should be appreciated that, the SeNB may configure the measurement gap and transmit the measurement gap configuration to the MeNB and the UE, and then the MeNB may adjust its own measurement gap. The procedure is similar to that mentioned above, and thus will not be particularly defined herein. The measurement gap may optionally be configured for a cell, and not performing data transmissions in the other cells may follow the identical rule. The procedure is similar to that mentioned above, and thus will not be particularly defined herein.

According to a fourth Embodiment, multiple measurement gap configurations set for cell groups are provided, where the multiple measurement gaps are coordinated to partially overlap each other.

Each of an SeNB and an MeNB sets a measurement gap configuration independently. Hence, before the coordination of the two measurement gap configurations, a UE should not perform the data reception and transmission within more subframes in an MCG and an SCG, as shown in FIG. 5.

In this embodiment, the rules for not performing data transmissions by the MeNB, the SeNB and the UE may be understood with reference to those mentioned in the second embodiment.

The present disclosure provides in this embodiment a data transmission method, which includes the following steps.

In step 1, a measurement gap configuration issued by an MeNB to a UE is set for an MCG, the MeNB transmits the measurement gap configuration set for the MCG to the SeNB.

Figure 7:
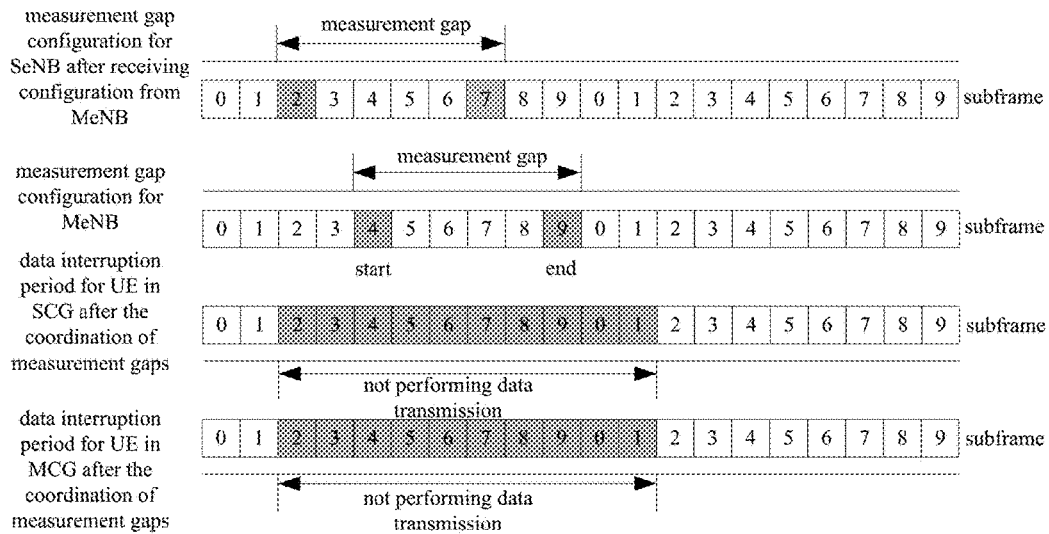
FIG. 7 is another schematic view showing the situation of not performing data transmission after the coordination of measurement gap configurations according to an embodiment of the present disclosure.

In step 2, after the receipt of the measurement gap configuration set for the MCG (subframes 4 to 9) in step 1, as shown in FIG. 7, the SeNB adjusts a measurement gap configuration set for an SCG to make the measurement gap configuration set for the SCG partially overlap the measurement gap configuration set for the MCG, here a measurement gap set for the SCG includes subframes 2 to 7. At serving frequencies of the SCG, the SeNB does not receive data from or transmit data to the UE within a time period (e.g., three consecutive subframes) specified in a protocol and starting from a start point of a measurement gap set for the MCG (e.g., a first substrate of the measurement gap, i.e., subframe 4), and does not receive data from or transmit data to the UE within a time period (e.g., three consecutive subframes) specified in the protocol and starting from an end point of the measurement gap set for the MCG (e.g., a last subframe of the measurement gap, i.e., subframe 9). In addition, the SeNB does not receive data from or transmit data to the UE within the measurement gap set for the SCG. The SeNB transmits the measurement gap configuration set by itself to the MeNB and the UE.

In step 3, after the transmission of the measurement gap configuration set for the MCG to the SeNB, the MeNB transmits the measurement gap configuration set for the MCG to the UE.

In step 4, after the receipt of the measurement gap configuration set for the SCG in step 2, as shown in FIG. 7, at serving frequencies of the MCG, the MeNB does not receive data from or transmit data to the UE within a time period (e.g., three consecutive subframes) specified in a protocol and starting from a start point of the measurement gap set for the SCG (e.g., a first substrate of the measurement gap, i.e., subframe 2), and does not receive data from or transmit data to the UE within a time period (e.g., three consecutive subframes) specified in the protocol and starting from an end point of the measurement gap set for the SCG (e.g., a last subframe of the measurement gap, i.e., subframe 7). In addition, the MeNB does not receive data from or transmit data to the UE within the measurement gap set for the MCG.

In step 5, after the receipt of the measurement gap set for the serving frequencies of the MCG in step 3 and the measurement gap set for the serving frequencies of the SCG in step 4, at the serving frequencies of the SCG, the UE does not receive or transmit data within a time period (e.g., three consecutive subframes) specified in a protocol and starting from a start point of the measurement gap set for the MCG (e.g., a first substrate of the measurement gap, i.e., subframe 4), and does not receive or transmit data within a time period (e.g., three consecutive subframes) specified in the protocol and starting from an end point of the measurement gap set for the MCG (e.g., a last subframe of the measurement gap, i.e., subframe 9); in addition, the UE does not receive or transmit data within the measurement gap set for the SCG. At the serving frequencies of the MCG, the UE does not receive or transmit data within a time period (e.g., three consecutive subframes) specified in a protocol and starting from a start point of the measurement gap set for the SCG (e.g., a first substrate of the measurement gap, i.e., subframe 2), and does not receive or transmit data within a time period (e.g., three consecutive subframes) specified in the protocol and starting from an end point of the measurement gap set for the SCG (e.g., a last subframe of each measurement gap, i.e., subframe 7); in addition, the UE does not receive or transmit data within the measurement gap set for the MCG.

It should be appreciated that, the SeNB may configure the measurement gap and transmit the measurement gap configuration to the MeNB and the UE, and then the MeNB may adjust its own measurement gap. The procedure is similar to that mentioned above, and thus will not be particularly defined herein. The measurement gap may optionally be configured for a cell, and not performing data transmissions in the other cells may follow the identical rule. The procedure is similar to that mentioned above, and thus will not be particularly defined herein.

Figure 8:
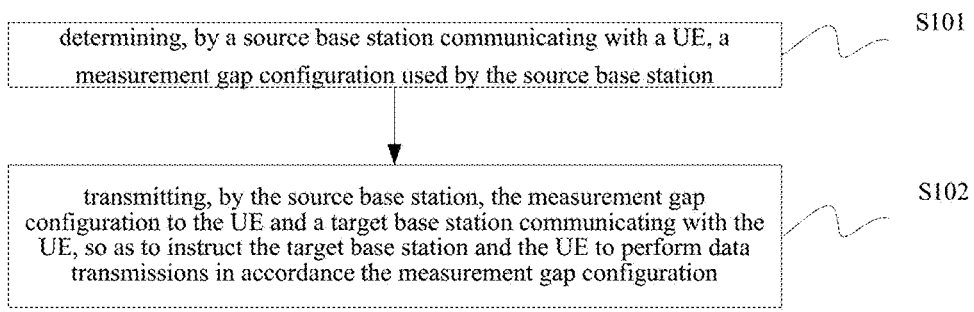
FIG. 8 is a flow chart of a data transmission control method according to an embodiment of the present disclosure.

Referring to FIG. 8, the present disclosure provides in some embodiments a data transmission control method at a network side, which includes: step S101 of determining, by a source base station communicating with a UE, a measurement gap configuration used by the source base station; and step S102 of transmitting, by the source base station, the measurement gap configuration to the UE and a target base station communicating with the UE, so as to instruct the target base station and the UE to perform data transmissions in accordance the measurement gap configuration.

According to the data transmission control method in the embodiments of the present disclosure, the source base station communicating with the UE notifies the measurement gap configuration used by the source base station to the target base station communicating with the UE, so that the target base station performs data transmission in accordance with the measurement gap configuration. As a result, it is able to prevent the packet loss during the measurement performed by the UE.

Optionally, the source base station is an MeNB and the target base station is an SeNB, or the source base station is an SeNB and the target base station is an MeNB.

Figure 9:
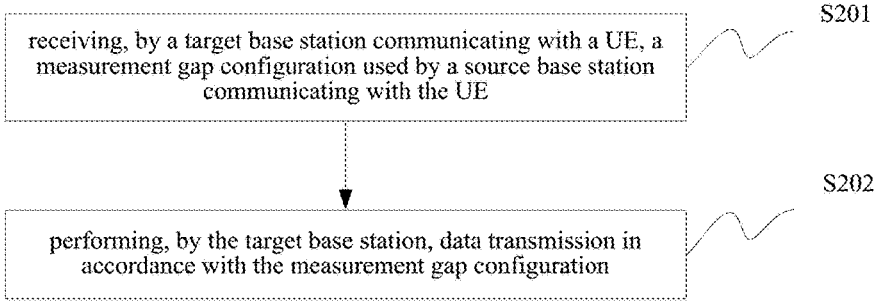
FIG. 9 is a flow chart of a data transmission method according to an embodiment of the present disclosure.

Referring to FIG. 9, the present disclosure provides in some embodiments a data transmission method at a network side, which includes: step 201 of receiving, by a target base station communicating with a UE, a measurement gap configuration used by a source base station communicating with the UE; and step S202 of performing, by the target base station, data transmission in accordance with the measurement gap configuration.

According to the data transmission method in the embodiments of the present disclosure, the target base station communicating with the UE may perform data transmission in accordance with the measurement gap configuration used by the source base station communicating with the UE. As a result, it is able to prevent the packet loss during the measurement performed by the UE.

Optionally, the step of performing, by the target base station, data transmission in accordance with the measurement gap configuration includes: determining, by the target base station, a start point for not performing data transmission within a measurement gap of the measurement gap configuration in accordance with a protocol; and with respect to each measurement gap, not performing, by the target base station, the data transmission between the target base station and the UE within a predetermined time period from the start point.

Optionally, the start point includes a first start point and a second start point, and with respect to each measurement gap, the target base station does not perform the data transmission between the target base station and the UE within the predetermined time period from the first start point and within the predetermined time period from the second start point.

Optionally, the first start point and the second start point are a start point and an end point of the measurement gap respectively.

Optionally, the data transmission method further includes setting, by the target base station, a measurement gap configuration used by the target base station based on the measurement gap configuration used by the source base station, and transmitting the measurement gap configuration used by the target base station to the source base station and the UE.

Optionally, the measurement gap configuration used by the target base station is completely or partially identical to the measurement gap configuration used by the source base station.

Figure 10:
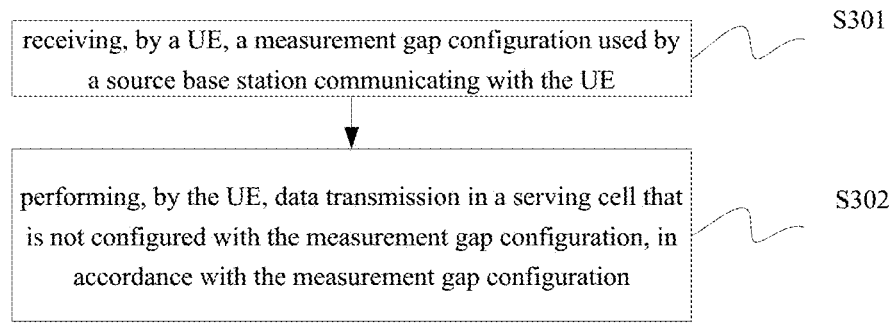
FIG. 10 is another flow chart of a data transmission method according to an embodiment of the present disclosure.

Referring to FIG. 10, the present disclosure provides in some embodiments a data transmission method at a UE side, which includes: step S301 of receiving, by a UE, a measurement gap configuration used by a source base station communicating with the UE; and step S302 of performing, by the UE, data transmission in a serving cell that is not configured with the measurement gap configuration, in accordance with the measurement gap configuration. The serving cell is not configured with the measurement gap configuration means the measurement gap configuration is not set for a frequency of the serving cell.

According to the data transmission method in the embodiments of the present disclosure, the UE performs data transmission in the serving cell that is not configured with the measurement gap configuration, in accordance with the measurement gap configuration. As a result, it is able to prevent the packet loss during the measurement performed by the UE.

Optionally, the step of perforing, by the UE, data transmission in the serving cell that is not configured with the measurement gap configuration, in accordance with the measurement gap configuration includes: determining, by the UE, a start point for not performing data transmission within a measurement gap of the measurement gap configuration in accordance with a protocol; and with respect to each measurement gap, not performing, by the UE, the data transmission in the serving cell that is not configured with the measurement gap configuration within a predetermined time period from the start point.

Optionally, the start point includes a first start point and a second start point, and with respect to each measurement gap, the UE does not perform the data transmission in the serving cell that is not configured with the measurement gap configuration within a predetermined time period from the first start point and within a predetermined time period from the second start point.

Optionally, the first start point and the second start point are a start point and an end point of the measurement gap respectively.

Figure 11:
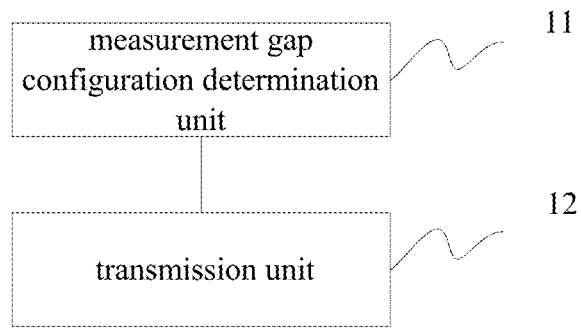
FIG. 11 is a schematic view showing a data transmission control device according to an embodiment of the present disclosure.

Similarly, referring to FIG. 11, the present disclosure further provides in some embodiments a data transmission control device at a network side, which includes: a measurement gap configuration determination unit 11 configured to determine a measurement gap configuration used by a source base station communicating with a UE; and a transmission unit 12 configured to transmit the measurement gap configuration to the UE and a target base station communicating with the UE, so as to instruct the target base station and the UE to perform data transmissions in accordance the measurement gap configuration.

According to the data transmission control device in the embodiments of the present disclosure, the source base station communicating with the UE notifies the measurement gap configuration used by the source base station to the target base station communicating with the UE, so that the target base station performs data transmission in accordance with the measurement gap configuration. As a result, it is able to prevent the packet loss during the measurement performed by the UE.

Optionally, the data transmission control device may be a base station.

Figure 12:
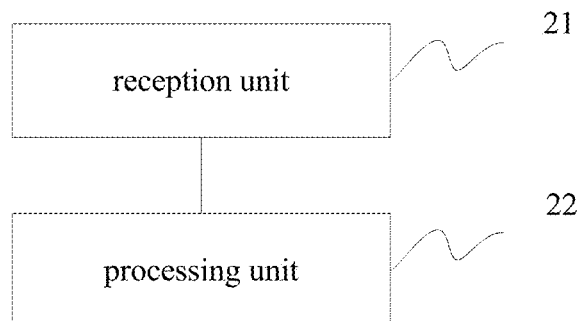
FIG. 12 is a schematic view showing a data transmission device according to an embodiment of the present disclosure.

Referring to FIG. 12, the present disclosure further provides in some embodiments a data transmission device at a network side, which includes: a reception unit 21 configured to receive a measurement gap configuration used by a source base station communicating with a UE; and a processing unit 22 configured to perform data transmission in accordance with the measurement gap configuration.

According to the data transmission device in the embodiments of the present disclosure, the target base station communicating with the UE may perform data transmission in accordance with the measurement gap configuration used by the source base station communicating with the UE. As a result, it is able to prevent the packet loss during the measurement performed by the UE.

Optionally, the processing unit 22 is further configured to: determine a start point for not performing data transmission within a measurement gap of the measurement gap configuration in accordance with a protocol; and with respect to each measurement gap, not perform the data transmission between the target base station and the UE within a predetermined time period from the start point.

Optionally, the start point includes a first start point and a second start point, and with respect to each measurement gap, the processing unit 22 is further configured to not perform the data transmission between the target base station and the UE within a predetermined time period from the first start point and within a predetermined time period from the second start point.

Optionally, the first start point and the second start point are a start point and an end point of the measurement gap respectively.

Optionally, the processing unit 22 is further configured to set a measurement gap configuration used by the target base station communicating with the UE based on the measurement gap configuration used by the source base station, and transmit the measurement gap configuration used by the target base station to the source base station and the UE.

Optionally, the measurement gap configuration used by the target base station is completely or partially identical to the measurement gap configuration used by the source base station.

Optionally, the data transmission device further includes the measurement gap configuration determination unit 11 and the transmission unit 12 in the above-mentioned data transmission control device, i.e., the data transmission device also may have functions of the above-mentioned data transmission control device.

Optionally, the data transmission device may also be a base station having all functions of the above-mentioned data transmission control device and data transmission device.

Figure 13:
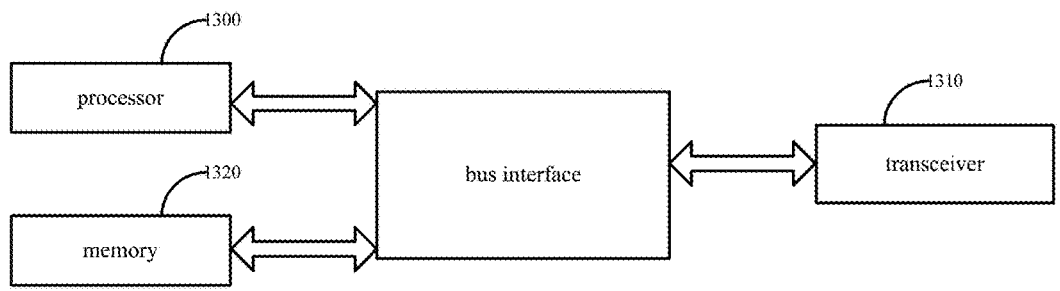
FIG. 13 is a schematic view showing an eNB according to an embodiment of the present disclosure.

Referring to FIG. 13, the present disclosure further provides in some embodiments an eNB, which includes a processor 1300, a transceiver 1310 configured to receive and transmit data under the control of the processor 1300, and a memory 1320 configured to store therein data used by the processor 1300 according to needs during the operation of the processor 1300.

In FIG. 13, a bus architecture may include a number of buses and bridges connected to each other, so as to connect various circuits of one or more processors represented by the processor 1300 and a memory represented by the memory 1320. In addition, as is known in the art, the bus architecture may be used to connect any other circuits, such as a circuit for a peripheral device, a circuit for a voltage stabilizer and a power management circuit. Bus interfaces are provided, and the transceiver 1310 may consist of more than one elements, e.g., it may include a transmitter and a receiver for communication with any other devices over a transmission medium. The processor 1300 takes charge of managing the bus architecture as well general processings, and the memory 1320 may store therein data desired for the operation of the processor 1300.

Optionally, in the case that the eNB is an MeNB, the processor 1300 is configured to: determine a measurement gap configuration used by a source base station communicating with a UE; and transmit, via the transceiver 1310, the measurement gap configuration to the UE and a target base station communicating with the UE, so as to instruct the target base station and the UE to perform data transmissions in accordance with the measurement gap configuration.

According to the MeNB in the embodiments of the present disclosure, the source base station communicating with the UE notifies the measurement gap configuration used by the source base station to the target base station communicating with the UE, so that the target base station performs data transmission in accordance with the measurement gap configuration. As a result, it is able to prevent the packet loss during the measurement performed by the UE.

Optionally, in the case that the eNB is an SeNB, the processor 1300 is configured to: receive, by the transceiver 1310, a measurement gap configuration used by a source base station communicating with a UE; and perform data transmission in accordance with the measurement gap configuration.

According to the SeNB in the embodiments of the present disclosure, the target base station communicating with the UE may perform data transmission in accordance with the measurement gap configuration used by the source base station communicating with the UE. As a result, it is able to prevent the packet loss during the measurement performed by the UE.

Figure 14:
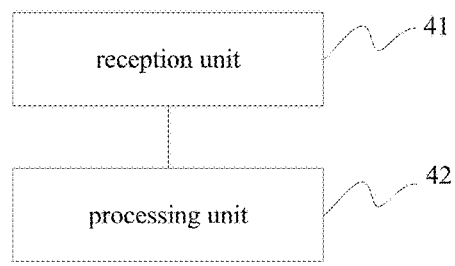
FIG. 14 is another schematic view showing a data transmission device according to an embodiment of the present disclosure.

Correspondingly, referring to FIG. 14, the present disclosure provides in some embodiments a data transmission device at a UE side, which includes: a reception unit 41 configured to receive a measurement gap configuration used by a source base station communicating with a UE; and a processing unit 42 configured to perform data transmission in a serving cell that is not configured with the measurement gap configuration, in accordance with the measurement gap configuration.

According to the data transmission device in the embodiments of the present disclosure, the UE performs data transmission in the serving cell that is not configured with the measurement gap configuration, in accordance with the measurement gap configuration. As a result, it is able to prevent the packet loss during the measurement performed by the UE.

Optionally, the processing unit 42 is further configured to: determine a start point for not performing data transmission within a measurement gap of the measurement gap configuration in accordance with a protocol; and with respect to each measurement gap, not perform the data transmission in the serving cell that is not configured with the measurement gap configuration within a predetermined time period from the start point.

Optionally, the start point includes a first start point and a second start point, and with respect to each measurement gap, the processing unit 42 is further configured to not perform the data transmission in the serving cell that is not configured with the measurement gap configuration within a predetermined time period from the first start point and within a predetermined time period from the second start point.

Optionally, the first start point and the second start point are a start point and an end point of the measurement gap respectively.

Figure 15:
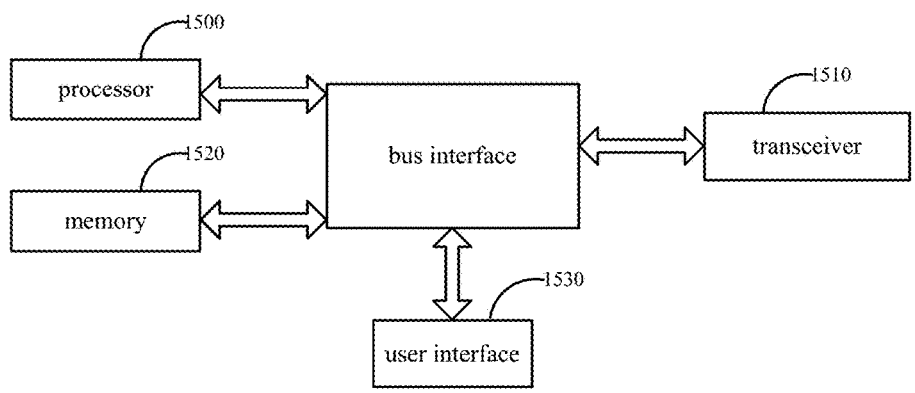
FIG. 15 is a schematic view showing a UE according to an embodiment of the present disclosure.

Referring to FIG. 15, the present disclosure provides in some embodiments a UE, which includes a processor 1500, a transceiver 1510 configured to receive and transmit data under the control of the processor 1500, and a memory 1520 configured to store therein data used by the processor 1500 according to needs during the operation. The processor 1500 is configured to: receive, via the transceiver 1510, a measurement gap configuration used by a source base station communicating with the UE; and transmit data in a serving cell that is not configured with the measurement gap configuration, in accordance with the measurement gap configuration.

In FIG. 15, a bus architecture may include a number of buses and bridges connected to each other, so as to connect various circuits of one or more processors represented by the processor 1500 and a memory represented by the memory 1520. In addition, as is known in the art, the bus architecture may be used to connect any other circuits, such as a circuit for a peripheral device, a circuit for a voltage stabilizer and a power management circuit. Bus interfaces are provided, and the transceiver 1510 may consist of more than one elements, e.g., it may include a transmitter and a receiver for communication with any other devices over a transmission medium. With respect to different UEs, a user interface 1530 may also be provided for devices which are to be arranged inside or outside the UE, and these devices may include but not limited to a keypad, a display, a speaker, a microphone and a joystick. The processor 1500 takes charge of managing the bus architecture as well general processings, and the memory 1520 may store therein data desired for the operation of the processor 1500.

In the embodiments of the present disclosure, the UE performs data transmission in the serving cell that is not configured with the measurement gap configuration, in accordance with the measurement gap configuration. As a result, it is able to prevent the packet loss during the measurement performed by the UE.

According to the embodiments of the present disclosure, after the source eNB sets a measurement gap configuration, the source eNB may transmit it to the target eNB. Then, within a time period specified by a protocol, the target eNB does not perform data transmission with the UE at the beginning and end of the measurement gap. In the case that the target eNB also sets a measurement gap configuration, the target eNB may adjust its own measurement gap configuration based on the measurement gap configuration used by the source eNB, so that the two measurement gap configurations completely or partially overlap each other. In the case that a large number of small cells are deployed within the coverage of a macro cell, the UE may communicate with multiple eNBs simultaneously or may be connected to the network via multiple cells simultaneously. At this time, the measurement gap configuration may be configured by the network side for all of, or a part of, the serving cells for the UE. As a result, through exchanging, among various base stations, information about the measurement gap configurations used by the various base stations and coordinating the periods and ranges of measurement gaps, it is able to reduce the packet loss and improve the data rate for the UE.

It should be appreciated that, the present disclosure may be provided as a method, a system or a computer program product, so the present disclosure may be in the form of full hardware embodiments, full software embodiments, or combinations thereof. In addition, the present disclosure may be in the form of a computer program product implemented on one or more computer-readable storage mediums (including but not limited to disk memory, Compact Disc Read-Only Memory (CD-ROM) and optical memory) including computer-readable program codes.

The present disclosure is described with reference to the flow charts and/or block diagrams showing the method, device (system) and computer program product according to the embodiments of the present disclosure. It should be appreciated that each process and/or block, or combinations thereof, in the flow charts and/or block diagrams may be implemented via computer program commands. These computer program commands may be applied to a general-purpose computer, a special-purpose computer, an embedded processor or any other processor of programmable data processing equipment, so as to form a machine, thereby to obtain the means capable of effecting the functions specified in one or more processes in the flow charts and/or one or more blocks in the block diagrams in accordance with the commands executed by the computer or the processor of the other programmable data processing equipment.

These computer program commands may also be stored in a computer-readable memory capable of guiding the computer or the other programmable data processing equipment to work in a special manner, so as to form a product including a command device capable of effecting the functions specified in one or more processes in the flow charts and/or one or more blocks in the block diagrams.

These computer program commands may also be loaded onto a computer or the other programmable data processing equipment, so as to perform a series of operations thereon and generate the processings implemented by the computer, thereby to provide the steps capable of effecting the functions specified one or more processes in the flow charts and/or one or more blocks in the block diagrams in accordance with the instructions.

The above are merely the preferred embodiments of the present disclosure. Obviously, a person skilled in the art may make further modifications and improvements without departing from the spirit of the present disclosure, and these modifications and improvements shall also fall within the scope of the present disclosure.

What is claimed is:

1. A data transmission method, comprising steps of:
receiving, by a target base station communicating with a User Equipment (UE), a measurement gap configuration used by a source base station communicating with the UE; and
performing, by the target base station, data transmission in accordance with the measurement gap configuration;
wherein the step of performing, by the target base station, data transmission in accordance with the measurement gap configuration comprises:
determining, by the target base station, a start point for not performing data transmission within a measurement gap configured by the measurement gap configuration, in accordance with a protocol; and
with respect to each measurement gap, not performing, by the target base station, data transmission between the target base station and the UE within a predetermined time period from the start point;
wherein the source base station does not receive or transmit data at all serving frequencies of a master cell group within each measurement gap set for the master cell group;
wherein the start point comprises a first start point and a second start point, and with respect to each measurement gap, the target base station does not perform the data transmission between the target base station and the UE within a predetermined time period from the first start point and within a predetermined time period from the second start point; and
wherein the first start point and the second start point are a start point and an end point of the measurement gap respectively.

2. The data transmission method according to claim 1, further comprising:
setting, by the target base station, a measurement gap configuration used by the target base station based on the measurement gap configuration used by the source base station, and transmitting the measurement gap configuration used by the target base station to the source base station and the UE.

3. The data transmission method according to claim 2, wherein the measurement gap configuration used by the target base station is completely or partially identical to the measurement gap configuration used by the source base station.

4. A data transmission method, comprising steps of:
receiving, by a User Equipment (UE), a measurement gap configuration used by a source base station communicating with the UE; and
performing, by the UE, data transmission between a target base station and the UE in accordance with the measurement gap configuration;
wherein the step of performing, by the UE, data transmission between the target base station and the UE in accordance with the measurement gap configuration comprises:
determining, by the UE, a start point for not performing data transmission within a measurement gap used by the source base station configured by the measurement gap configuration, in accordance with a protocol; and
with respect to each measurement gap, not performing, by the UE, data transmission between the target base station and the UE within a predetermined time period from the start point;
wherein the source base station does not receive or transmit data at all serving frequencies of a master cell group within each measurement gap set for the master cell group;
wherein the start point comprises a first start point and a second start point, and with respect to each measurement gap, the UE does not perform data transmission between the target base station and the UE within a predetermined time period from the first start point and within a predetermined time period from the second start point; and
wherein the first start point and the second start point are a start point and an end point of the measurement gap respectively.

5. A data transmission device, comprising:
a processor, a transceiver configured to receive and transmit data under control of the processor, and a memory storing therein data that is accessible by the processor according to needs; wherein
the processor is configured to:
receive, via the transceiver, a measurement gap configuration used by a source base station communicating with a User Equipment (UE); and
perform data transmission between a target base station and the UE in accordance with the measurement gap configuration;
wherein the processor is further configured to:
determine a start point for not performing data transmission within a measurement gap used by the source base station configured by the measurement gap configuration, in accordance with a protocol; and
with respect to each measurement gap, not perform data transmission between the target base station and the UE within a predetermined time period from the start point;
wherein the start point comprises a first start point and a second start point, and with respect to each measurement gap, the processor is configured to not perform data transmission between the target base station and the UE within a predetermined time period from the first start point and within a predetermined time period from the second start point; and
wherein the first start point and the second start point are a start point and an end point of the measurement gap respectively.

* * * * *